United States Patent
Fujishiro

(10) Patent No.: US 9,487,195 B2
(45) Date of Patent: Nov. 8, 2016

(54) COLLISION AVOIDANCE ASSISTANCE DEVICE AND COLLISION AVOIDANCE ASSISTANCE METHOD

(75) Inventor: Ryo Fujishiro, Isehara (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/423,203

(22) PCT Filed: Sep. 4, 2012

(86) PCT No.: PCT/JP2012/072484
§ 371 (c)(1),
(2), (4) Date: Apr. 3, 2015

(87) PCT Pub. No.: WO2014/037998
PCT Pub. Date: Mar. 13, 2014

(65) Prior Publication Data
US 2015/0232073 A1    Aug. 20, 2015

(51) Int. Cl.
*B60T 7/22* (2006.01)
*G01S 13/93* (2006.01)
*G01S 17/93* (2006.01)

(52) U.S. Cl.
CPC .............. *B60T 7/22* (2013.01); *G01S 13/931* (2013.01); *G01S 17/936* (2013.01)

(58) Field of Classification Search
CPC ........ B60T 7/22; B60T 8/72; B60T 2201/02; B60T 2201/022; G01S 13/93; G01S 13/931
See application file for complete search history.

(56) References Cited

U.S. PATENT DOCUMENTS

| | | | |
|---|---|---|---|
| 7,389,172 B2 * | 6/2008 | Sugano | 701/96 |
| 7,647,153 B2 * | 1/2010 | Sugano | 701/96 |
| 8,868,326 B2 * | 10/2014 | Heinrichs-Bartscher et al. | 701/301 |
| 8,868,327 B2 * | 10/2014 | Heinrichs-Bartscher et al. | 701/301 |
| 2004/0193351 A1 * | 9/2004 | Takahashi et al. | 701/70 |
| 2005/0125133 A1 * | 6/2005 | Yamada et al. | 701/70 |
| 2005/0159876 A1 * | 7/2005 | Sugano | 701/96 |
| 2005/0182551 A1 * | 8/2005 | Sugano | 701/96 |
| 2008/0167781 A1 * | 7/2008 | Labuhn et al. | 701/48 |
| 2009/0005949 A1 * | 1/2009 | Sugano | 701/96 |
| 2012/0320207 A1 * | 12/2012 | Toyofuku | 348/148 |

(Continued)

FOREIGN PATENT DOCUMENTS

| | | | |
|---|---|---|---|
| DE | 10 2010 051 203 A1 | 5/2012 | |
| JP | 2008-296886 A | 12/2008 | |
| JP | 2009-51241 A | 3/2009 | |

(Continued)

OTHER PUBLICATIONS

International Search Report for PCT/JP2012/072484 dated Oct. 2, 2012 [PCT/ISA/210].

*Primary Examiner* — Thomas G Black
*Assistant Examiner* — Ce Li
(74) *Attorney, Agent, or Firm* — Sughrue Mion, PLLC

(57) ABSTRACT

A collision avoidance assistance device includes an assistance execution unit configured to execute collision avoidance assistance in a case where it is determined that a vehicle will collide with an object, in which, when it is not determined whether the vehicle will collide with the object or not during execution of the automatic braking based on the collision avoidance assistance, the assistance execution unit is configured to inhibit cancellation of the automatic braking in a case where the object is present in front of the vehicle.

6 Claims, 5 Drawing Sheets

(56) References Cited

U.S. PATENT DOCUMENTS

2014/0032094 A1* 1/2014 Heinrichs-Bartscher et al. ............... 701/301
2014/0052355 A1* 2/2014 Heinrichs-Bartscher et al. ............... 701/70

FOREIGN PATENT DOCUMENTS

| | | |
|---|---|---|
| JP | 2009-101756 A | 5/2009 |
| JP | 2011-91549 A | 5/2011 |
| JP | 2011-110958 A | 6/2011 |
| JP | 2011-175560 A | 9/2011 |

* cited by examiner

COLLISION AVOIDANCE ASSISTANCE DEVICE AND COLLISION AVOIDANCE ASSISTANCE METHOD

CROSS REFERENCE TO RELATED APPLICATIONS

This application is a National Stage of International Application No. PCT/JP2012/072484, filed on Sep. 4, 2012, the contents of all of which are incorporated herein by reference in their entirety.

TECHNICAL FIELD

The present invention relates to a collision avoidance assistance device and a collision avoidance assistance method, capable of assisting collision avoidance between a vehicle and an object.

BACKGROUND ART

In the related art, as a collision avoidance assistance device and a collision avoidance assistance method, as disclosed in Japanese Unexamined Patent Application Publication No. 2008-296886, a device and a method are known in which a braking operation of a driver is assisted through automatic braking in order to avoid collision with an object on the front side of a vehicle.

CITATION LIST

Patent Literature

[Patent Literature 1] Japanese Unexamined Patent Application Publication No. 2008-296886

SUMMARY OF INVENTION

Technical Problem

Meanwhile, in automatic braking based on collision avoidance assistance, generally, if it is determined that a vehicle will collide with an object, a braking amount increases, and if it is determined that the vehicle will not collide with the object after the collision is determined, a braking amount decreases. However, if a braking amount decreases in a case where an object is present in front of a vehicle, it is expected that the collision avoidance assistance operation will give a sense of incongruity to a driver. Particularly, if an object which crosses a front side of a vehicle decelerates or stops in front of the vehicle, it is expected that the driver has a significant sense of incongruity.

Therefore, an object of the present invention is to provide a collision avoidance assistance device and a collision avoidance assistance method, capable of minimizing a sense of incongruity which a collision avoidance assistance operation gives to a driver.

Solution to Problem

According to the present invention, there is provided a collision avoidance assistance device including an assistance execution unit configured to execute collision avoidance assistance in a case where it is determined that a vehicle will collide with an object, in which, when it is not determined whether the vehicle will collide with the object or not during execution of the automatic braking based on the collision avoidance assistance, the assistance execution unit is configured to inhibit cancellation of the automatic braking in a case where the object is present in front of the vehicle.

Consequently, when it is not determined whether the vehicle will collide with the object or not during execution of the automatic braking based on the collision avoidance assistance, cancellation of the automatic braking is inhibited in a case where the object is present in front of the vehicle. Therefore, in a case where the object is present in front of the vehicle, it is possible to minimize a sense of incongruity which the collision avoidance assistance operation gives to a driver.

In addition, when it is not determined whether the vehicle will collide with the object or not during execution of the automatic braking based on the collision avoidance assistance, the assistance execution unit may be configured not to inhibit cancelation of the automatic braking in a case where the object is not present in front of the vehicle. Consequently, in a case where the object is not present in front of the vehicle, it is possible to minimize unnecessary deceleration.

In addition, when a determination of collision between the vehicle and the object is changed to a determination of non-collision therebetween before and after the automatic braking is started, the assistance execution unit may be configured to inhibit cancellation of the automatic braking in a case where the object is present in front of the vehicle, and the assistance execution unit may be configured not to inhibit cancellation of the automatic braking in a case where the object is not present in front of the vehicle.

In addition, the collision avoidance assistance device may further include a collision determination unit configured to determine that the object is present in front of the vehicle in a case where a horizontal position of the object is present within a vehicle width or a region in which a marginal width is added to the vehicle width in a traveling direction of the vehicle. Furthermore, the collision determination unit may be configured to determine whether or not the object is present in front of the vehicle on the basis of the present position of the object until the automatic braking based on the collision avoidance assistance is finished from the start thereof.

In addition, the collision avoidance assistance device may assist avoidance of collision between the vehicle and an object which crosses the front side of the vehicle.

According to the present invention, there is provided a collision avoidance assistance method of executing collision avoidance assistance in a case where it is determined that a vehicle will collide with an object, the method including inhibiting cancellation of automatic braking in a case where the object is present in front of the vehicle, when it is not determined whether the vehicle will collide with the object or not during execution of the automatic braking based on the collision avoidance assistance.

Advantageous Effects of Invention

According to the present invention, it is possible to provide a collision avoidance assistance device and a collision avoidance assistance method, capable of minimizing a sense of incongruity which a collision avoidance assistance operation gives to a driver.

DESCRIPTION OF EMBODIMENTS

Figure 1:
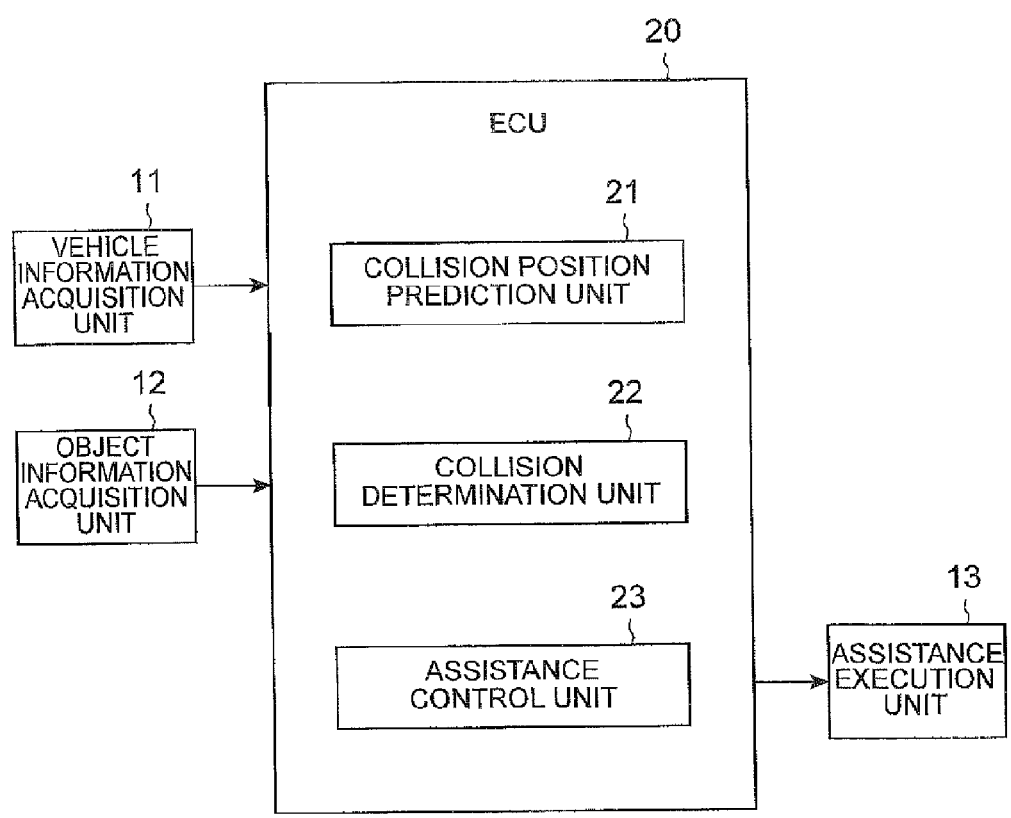
FIG. 1 is a block diagram illustrating a configuration of a collision avoidance assistance device according to an embodiment of the present invention.

Hereinafter, an embodiment of the present invention will be described in detail with reference to the accompanying drawings. In addition, in description of the drawings, the same elements are given the same reference numerals, and repeated description will be omitted.

First, with reference to FIGS. 1 and 2, a description will be made of a configuration of a collision avoidance assistance device according to the embodiment of the present invention. FIG. 1 is a block diagram illustrating a configuration of the collision avoidance assistance device according to the embodiment of the present invention.

The collision avoidance assistance device is a device which is mounted in a vehicle and assists collision avoidance between the vehicle and an object, and is also called Pre-Crash Safety (PCS; registered trademark). As illustrated in FIG. 1, the collision avoidance assistance device includes a vehicle information acquisition unit 11, an object information acquisition unit 12, an assistance execution unit 13, and an electronic control unit (ECU) 20.

The vehicle information acquisition unit 11 acquires vehicle information indicating a position and movement circumstances of the vehicle. For example, a GPS sensor, a wheel speed sensor, an acceleration sensor, a steering angle sensor, and a yaw rate sensor are used in the vehicle information acquisition unit 11. The vehicle information acquisition unit 11 acquires, for example, the present position, a traveling direction, velocity, acceleration, a steering angle, and a yaw rate of the vehicle, as the vehicle information, and supplies the vehicle information to the ECU 20.

The object information acquisition unit 12 acquires object information indicating a position and movement circumstances of an object which is present on the front side of the vehicle. The object is, for example, an obstacle which may impede traveling of the vehicle, such as an oncoming vehicle, a leading vehicle, a bicycle, or a pedestrian. For example, a radar sensor using millimeter waves or laser, and a camera sensor are used in the object information acquisition unit 12. The object information acquisition unit 12 acquires, for example, a distance to the object, and a horizontal position and a horizontal width of the object, as the object information, and supplies the object information to the ECU 20. The object information acquisition unit 12 is constituted by a stereo camera sensor alone, or a combination of a radar sensor and the stereo camera sensor.

For example, the radar sensor acquires object information on the basis of transmission and reception results of sensor waves which are transmitted ahead of the vehicle and are reflected from an object to be received. The distance to the object indicates a distance from the sensor to the object in a traveling direction of the vehicle, and may be obtained on the basis of the time when the sensor waves are transmitted and are reflected from the object to be received. The horizontal position of the object indicates a distance from a center of the vehicle to the object in a direction perpendicular to the traveling direction of the vehicle, and may be obtained on the basis of a reception angle of the sensor waves which are reflected from the object to be received.

In addition, the stereo camera sensor acquires object information according to the principle of triangulation on the basis of a deviation of the appearance of the object on image data of left and right cameras. The stereo camera sensor acquires a distance to the object, a horizontal position of the object, and a horizontal width of the object. Further, a mono camera sensor acquires object information, for example, on the basis of a size and a position of a number plate of a vehicle ahead, or on the basis of a grounding position of an object.

Figure 2:
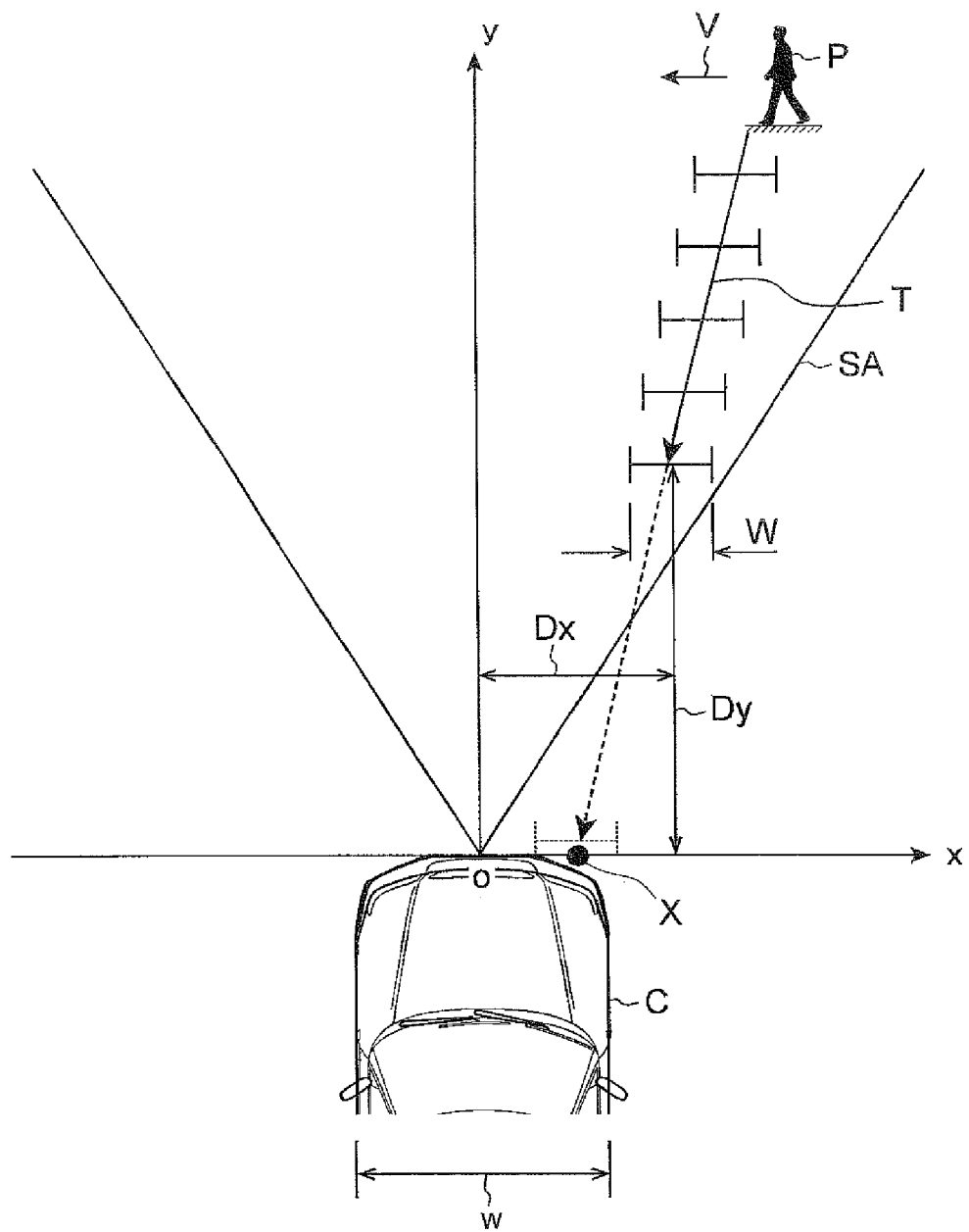
FIG. 2 is a diagram illustrating parameters used for collision avoidance assistance.

FIG. 2 is a diagram illustrating parameters used for the collision avoidance assistance. FIG. 2 illustrates changes in relative positions between a vehicle C and an object P in time series. The object P is an object which moves in a direction intersecting a traveling direction of the vehicle, such as a pedestrian who moves across the front side of the vehicle. In FIG. 2, along with a detection range SA of the sensor, object information formed by the above-described distance (Dy), horizontal position (Dx) and horizontal width (W) is defined. The object information is defined by using, for example, the origin O which is set as a position of the sensor, an x coordinate which has the right side of the vehicle C as a positive side, and a y coordinate corresponding to the traveling direction of the vehicle C.

Referring to FIG. 1 again, the assistance execution unit 13 executes collision avoidance assistance in a case where it is determined that the vehicle will collide with the object. The assistance execution unit 13 executes at least one of notification assistance and control assistance. In the notification assistance, for example, a driver is notified of a collision risk and a necessity for a collision avoidance operation. For the notification assistance, for example, an in-vehicle monitor, a speaker, or a vibrator provided in a seat or a steering wheel is used. In the control assistance, at least one of braking intervention and steering intervention of the vehicle is executed. In the control assistance, at least one of a braking device and a steering device is operated in order to avoid collision with the object, by using a signal supplied from the ECU 20.

Here, the assistance execution unit 13 inhibits cancellation of automatic braking in a case where the object is present in front of the vehicle when it is not determined whether the vehicle will collide with the object or not during the execution of the automatic braking based on the collision avoidance assistance. In addition, the assistance execution unit 13 does not inhibit cancellation of the automatic braking, that is, cancels the automatic braking in a case where the object is not present in front of the vehicle when it is not determined whether the vehicle will collide with the object or not during the execution of the automatic braking based on the collision avoidance assistance. Further, the presence of the object in front of the vehicle indicates that a horizontal position of the object is present within a vehicle width or a region in which a marginal width is added to the vehicle width in the traveling direction of the vehicle. Furthermore, the cancellation of the automatic braking indicates that the automatic braking is finished, or a braking amount of the automatic braking is reduced.

The ECU 20 includes a collision position prediction unit 21, a collision determination unit 22, and an assistance control unit 23. The ECU 20 is mainly constituted by a CPU, a ROM, and a RAM, and the CPU executes the program so as to realize functions of the collision position prediction unit 21, the collision determination unit 22, and the assistance control unit 23.

The collision position prediction unit 21 predicts a collision position (horizontal collision position) between the vehicle and the object in a vehicle width direction. A prediction result (predicted collision position) of the collision position indicates a central position of the horizontal width of the object, and is predicted on the basis of a relationship between a position of the vehicle in the future or at present and a position of the object in the future. The position of the vehicle is predicted on the basis of the present position or movement circumstances of the vehicle by using the vehicle information. The position of the object is predicted on the basis of movement circumstances of the object by using the object information.

FIG. 2 described above illustrates a predicted collision position X. A movement vector of the object is obtained on the basis of a movement trajectory T of the object, and the predicted collision position X is predicted as indicated by the dotted line of FIG. 2 on the basis of the obtained movement vector. In FIG. 2, since the vehicle C and the object P perform uniform linear motion, the object P also depicts the linear movement trajectory T. However, as described later, if the vehicle C is decelerated, approaching velocity toward the object P in the traveling direction of the vehicle C is reduced, and thus the object P depicts a movement trajectory which is curved in a direction away from the vehicle C.

Referring to FIG. 1 again, the collision determination unit 22 determines whether or not the vehicle will collide with the object on the basis of the object information and the predicted collision position. The collision determination unit 22 determines that the vehicle will collide with the object if the horizontal position of the object and the predicted collision position satisfy threshold values, and a predicted time to the collision (predicted collision time) is below a threshold value. On the other hand, if these conditions are not satisfied, the collision determination unit 22 determines that the vehicle will not collide with the object.

The assistance control unit 23 controls the assistance execution unit 13 to execute the collision avoidance assistance depending on whether or not it is determined that the vehicle will collide with the object. The assistance control unit 23 controls the assistance execution unit 13 to execute at least one of the notification assistance and the control assistance.

Here, when it is not determined whether the vehicle will collide with the object or not during execution of automatic braking based on the collision avoidance assistance, in a case where the object is present in front of the vehicle, the assistance control unit 23 controls the assistance execution unit 13 to inhibit cancelation of the automatic braking. In addition, when it is not determined whether the vehicle will collide with the object or not during execution of automatic braking based on the collision avoidance assistance, in a case where the object is not present in front of the vehicle, the assistance control unit 23 controls the assistance execution unit 13 not to inhibit cancellation of the automatic braking.

Next, with reference to FIGS. 3 to 5, a description will be made of an operation of the collision avoidance assistance device illustrated in FIG. 1.

Figure 3:
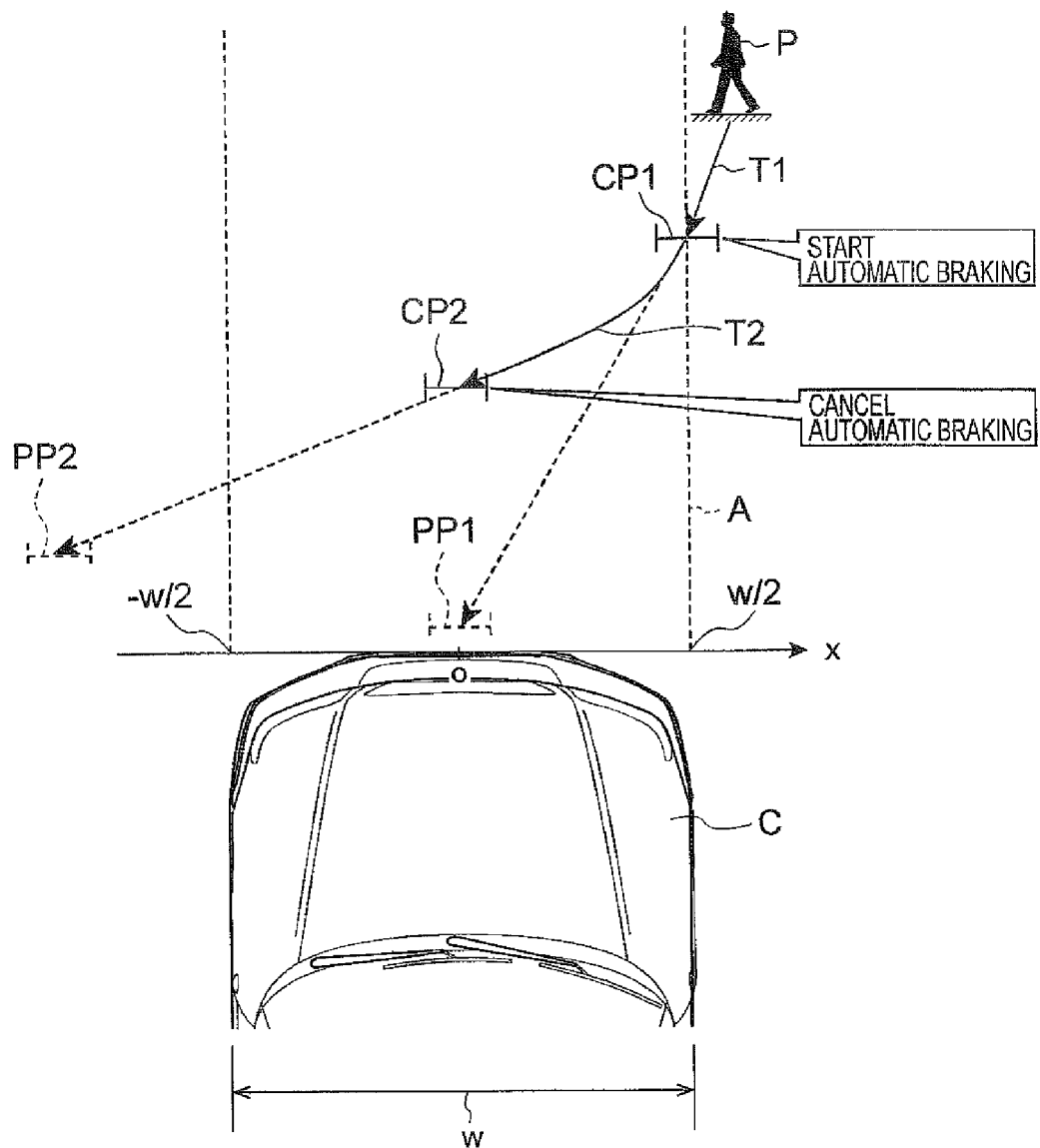
FIG. 3 is a diagram illustrating circumstances expected in the collision avoidance assistance.

FIG. 3 is a diagram illustrating circumstances which are expected in the collision avoidance assistance. FIG. 3 illustrates changes in relative positions between the vehicle C and the object P in a time series. As the object P, an object is assumed which moves in a direction intersecting the traveling direction of the vehicle C, particularly, in a direction perpendicular thereto, such as a pedestrian crossing the front side of the vehicle C.

As illustrated in FIG. 3, at a first time point when the object P is present at a position CP1, the object P depicts a linear movement trajectory T1 and enters a region A in front of the vehicle C. In addition, the predicted collision time is assumed to be below a threshold value in an assistance start determination. At this time point, since the object P is present in front of the vehicle C, and the occurrence of collision is predicted on the basis of a predicted collision position PP1 which is obtained from the linear movement trajectory T1, the automatic braking based on the collision avoidance assistance is started.

At a second time point when the object P is present at a position CP2, approaching velocity toward the object P in the traveling direction of the vehicle C is reduced due to the automatic braking, and thus a movement trajectory T2 of the object P is curved in a direction away from the vehicle. At this time point, since the object P is present in front of the vehicle C, and the avoidance of collision is predicted on the basis of a predicted collision position PP2 which is obtained from the curved movement trajectory T2, the automatic braking based on the collision avoidance assistance is canceled.

However, at the second time point, the object P is still present in front of the vehicle C, and determination accuracy of a collision possibility is reduced due to the change (T1→T2) in the movement trajectory, caused by the automatic braking. In addition, if the automatic braking is canceled in this state, approaching velocity toward the object P in the traveling direction of the vehicle C increases again, and thus the driver has a sense of uneasiness that collision with the object P may occur. For this reason, it is expected that the collision avoidance assistance operation will give a sense of incongruity to the driver. Particularly, if the object P decelerates or stops in front of the vehicle, it is expected that this will give a significant sense of incongruity to the driver.

Figure 4:
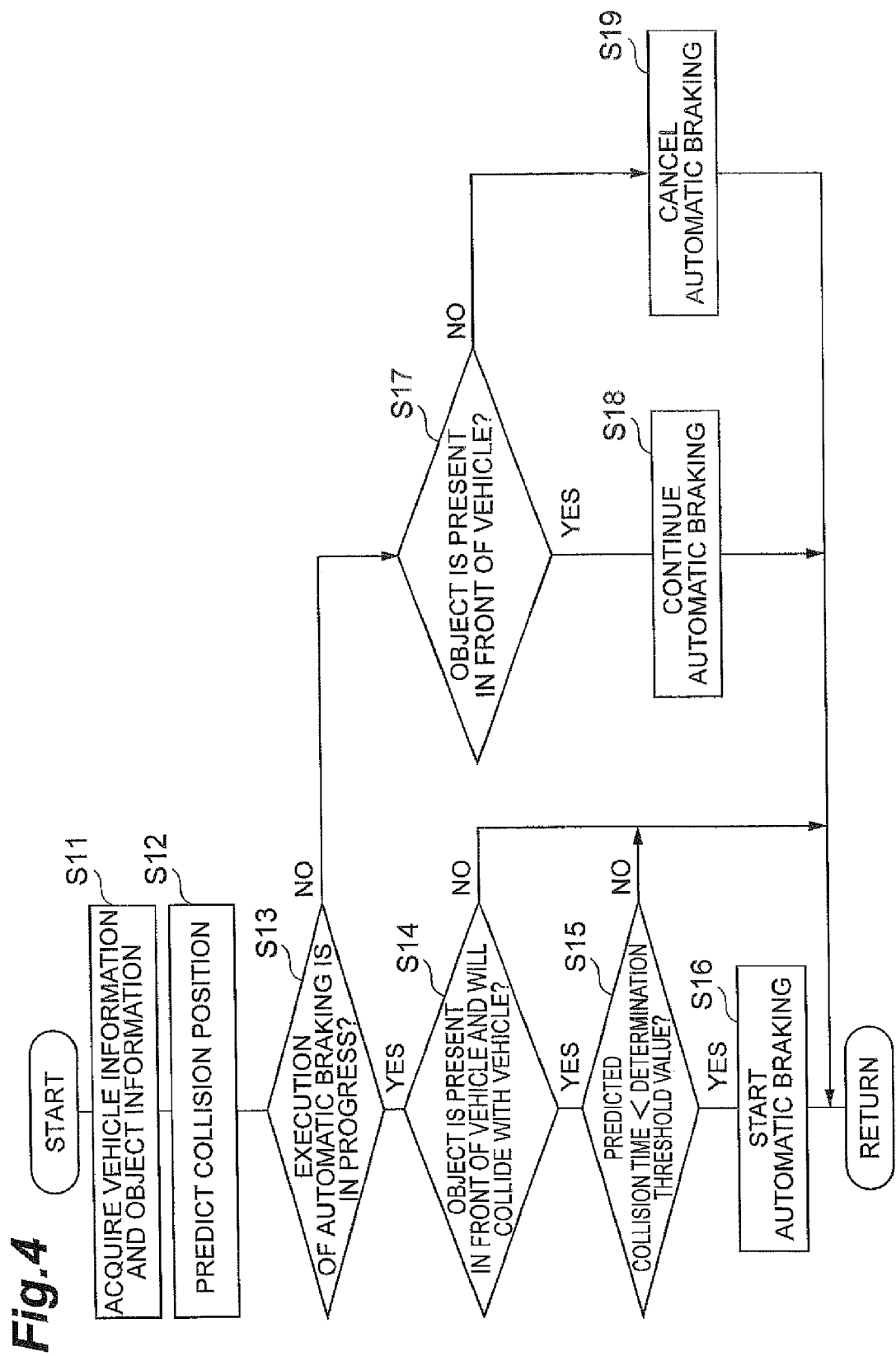
FIG. 4 is a flowchart illustrating an operation of a collision avoidance assistance device, and a collision avoidance assistance method.

FIG. 4 is a flowchart illustrating an operation of the collision avoidance assistance device and a collision avoidance assistance method. The collision avoidance assistance device repeatedly performs a process illustrated in FIG. 4 in a predetermined process cycle.

As illustrated in FIG. 4, the vehicle information acquisition unit 11 acquires vehicle information, and the object information acquisition unit 12 acquires object information (a distance to an object, and a horizontal position and a horizontal width of the object) (step S11). The collision position prediction unit 21 predicts a collision position (predicted collision position) on the basis of the vehicle information and the object information (step S12).

The assistance control unit 23 determines whether or not execution of automatic braking is in progress (step S13). If it is determined that the execution of the automatic braking is not in progress, the collision avoidance assistance device performs a process of starting the automatic braking in steps S14 to S16 described later, and if it is determined that the execution of the automatic braking is in progress, the collision avoidance assistance device performs a process of canceling continuity of the automatic braking in steps S17 to S19 described later.

If it is determined that execution of the automatic braking is in progress in step S13, the collision determination unit 22 determines whether or not an object is present in front of the vehicle, and will collide with the vehicle (step S14). Specifically, the collision determination unit 22 determines whether or not an absolute value of the horizontal position is below a first threshold value, and an absolute value of the predicted collision position is below a second threshold value.

The first and second threshold values are typically set to a value corresponding to ½ of a horizontal width (a vehicle width w) of the vehicle. At least one of the first and second threshold values may be set by adding a marginal value to ½ of the vehicle width, and may be set to be greater as a distance to an object is longer in consideration of detection accuracy of object information. In other words, if the horizontal position of the object in the traveling direction of the vehicle is present in the vehicle width or a region in which a marginal width is added to the vehicle width, the collision determination unit 22 determines that the object is present in front of the vehicle.

If it is determined in step S14 that the object is present in front of the vehicle and will collide with the vehicle, the collision determination unit 22 determines whether or not the predicted collision time is below a determination threshold value (step S15). The predicted collision time is obtained by dividing a distance to the object for each process cycle by relative velocity (a differential value of the distance to the object) of the object. In addition, it is determined that the predicted collision time is below the determination threshold value, the assistance execution unit 13 starts the automatic braking based on the collision avoidance assistance under the control of the assistance control unit 23 (step S16).

If it is determined in step S14 that the object is present in front of the vehicle and will not collide with the vehicle, or if it is determined that the predicted collision time is not below a determination threshold value in step S15, the process is finished.

On the other hand, if it is determined in S13 that execution of the automatic braking is in progress, the collision determination unit 22 determines whether or not the object is present in front of the vehicle (step S17). Specifically, the collision determination unit 22 determines whether or not the absolute value of the horizontal position is below the above-described first threshold value. The collision determination unit 22 determines whether or not the object is present in front of the vehicle on the basis of the present position of the object until the automatic braking based on the collision avoidance assistance is finished from the start thereof.

In addition, if it is determined that the object is present in front of the vehicle, the assistance execution unit 13 continues the automatic braking based on the collision avoidance assistance under the control of the assistance control unit 23 (step S18). On the other hand, if it is determined that the object is not present in front of the vehicle, the assistance execution unit 13 cancels the automatic braking based on the collision avoidance assistance under the control of the assistance control unit 23 (step S19).

That is, if the object is present in front of the vehicle, the assistance execution unit 13 inhibits cancellation of the automatic braking, and, on the other hand, if the object is not present in front of the vehicle, the assistance execution unit 13 does not inhibit cancellation of the automatic braking. In other words, when a determination of collision is changed to a determination of non-collision before and after the automatic braking is started, if the object is present in front of the vehicle, the assistance execution unit 13 inhibits cancellation of the automatic braking, and, on the other hand, if the object is not present in front of the vehicle, the assistance execution unit 13 does not inhibit cancellation of the automatic braking.

Figure 5:
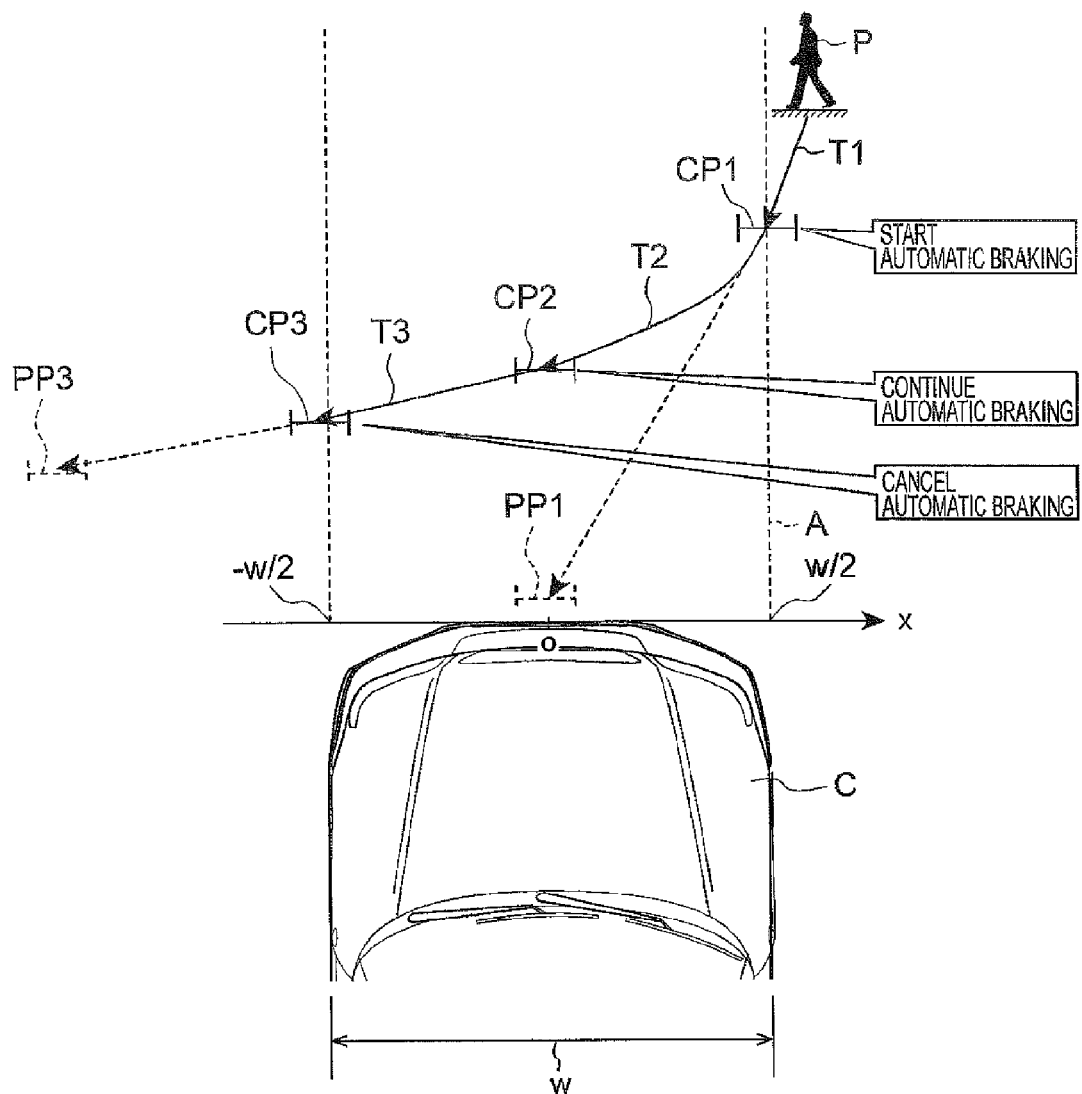
FIG. 5 is a diagram illustrating circumstances of collision avoidance assistance illustrated in FIG. 4.

FIG. 5 is a diagram illustrating circumstances of the collision avoidance assistance illustrated in FIG. 4. In the same manner as in FIG. 3, FIG. 5 illustrates changes in relative positions between the vehicle C and the object P. As illustrated in FIG. 5, in the collision avoidance assistance process illustrated in FIG. 4, since the object P is still present in front of the vehicle C at the second time point when the object P is present at the position CP2, the automatic braking is not canceled but is continued, that is, cancellation of the automatic braking is inhibited, unlike in the process illustrated in FIG. 3.

In addition, at a third time point when the object P is present at a position CP3, the object P depicts a linear movement trajectory T3 and crosses a region in front of the vehicle C. At this time point, since the object P has already crossed the front side of the vehicle C, and avoidance of collision is predicted on the basis of a predicted collision position PP3 obtained from the substantially linear movement trajectory T3, the automatic braking based on the collision avoidance assistance is canceled, that is, cancellation of the automatic braking is not inhibited.

Here, at the third time point, the object P has already been absent in front of the vehicle C. Therefore, even if the automatic braking is canceled in this state and the vehicle C travels, the driver does not have a sense of uneasiness that collision with the object P may occur. For this reason, even if the object P decelerates or stops, the collision avoidance assistance does not give a sense of incongruity to the driver.

As described above, according to the collision avoidance assistance device and the collision avoidance assistance method according to the embodiment of the present invention, when it is not determined whether a vehicle will collide with an object or not during execution of automatic braking based on collision avoidance assistance, cancellation of the automatic braking is inhibited in a case where the object is present in front of the vehicle. Therefore, in a case where the object is present in front of the vehicle, it is possible to minimize a sense of incongruity which the collision avoidance assistance operation gives to a driver. In addition, in a case where the object is not present in front of the vehicle, the cancellation of the automatic braking is not inhibited, and thus it is possible to minimize unnecessary deceleration.

In addition, the above-described embodiment is a preferred embodiment of the collision avoidance assistance device and the collision avoidance assistance method according to the present invention, and the collision avoidance assistance device and the collision avoidance assistance method according to the present invention are not limited to ones described in the present embodiment. The collision avoidance assistance device and the collision avoidance assistance method according to the present invention may be applied to modifications or the like obtained by applying the collision avoidance assistance device and the collision avoidance assistance method according to the present embodiment within the scope without departing from the spirit of the inventions recited in the respective claims.

REFERENCE SIGNS LIST

11 VEHICLE INFORMATION ACQUISITION UNIT
12 OBJECT INFORMATION ACQUISITION UNIT
13 ASSISTANCE EXECUTION UNIT
20 ECU
21 COLLISION POSITION PREDICTION UNIT
22 COLLISION DETERMINATION UNIT
23 ASSISTANCE CONTROL UNIT

The invention claimed is:

1. A collision avoidance assistance device comprising:
an assistance execution unit configured to execute collision avoidance assistance in a case where it is determined that a vehicle will collide with an object; and
a collision determination unit configured to determine that the object is present in front of the vehicle in a case where a horizontal position of the object is present within a vehicle width or a region in which a marginal width is added to the vehicle width in a traveling direction of the vehicle,
wherein, when it is determined the vehicle will not collide with the object during execution of the automatic braking based on the collision avoidance assistance, the assistance execution unit is configured to inhibit cancelation of the automatic braking in a case where the object is present in front of the vehicle, and
wherein the collision determination unit determines whether the object is present in front of the vehicle on the basis of the present position of the object until the automatic braking based on the collision avoidance assistance is finished from the start thereof.

2. The collision avoidance assistance device according to claim 1, wherein, when it is determined the vehicle will not collide with the object during execution of the automatic braking based on the collision avoidance assistance, the assistance execution unit is configured not to inhibit cancelation of the automatic braking in a case where the object is not present in front of the vehicle.

3. The collision avoidance assistance device according to claim 1, wherein, when a determination of collision between the vehicle and the object is changed to a determination of non-collision therebetween before and after the automatic braking is started, the assistance execution unit is configured to inhibit cancelation of the automatic braking in a case where the object is present in front of the vehicle.

4. The collision avoidance assistance device according to claim 1, wherein, when a determination of collision between the vehicle and the object is changed to a determination of non-collision therebetween before and after the automatic braking is started, the assistance execution unit is configured not to inhibit cancelation of the automatic braking in a case where the object is not present in front of the vehicle.

5. The collision avoidance assistance device according to claim 1, wherein the object is an object which crosses the front side of the vehicle.

6. A collision avoidance assistance method of executing collision avoidance assistance in a case where it is determined that a vehicle will collide with an object, the method comprising:
determining that the object is present in front of the vehicle in a case where a horizontal position of the object is present within a vehicle width or a region in which a marginal width is added to the vehicle width in a traveling direction of the vehicle,
inhibiting cancelation of automatic braking in a case where the object is present in front of the vehicle, when it is determined the vehicle will not collide with the object during execution of the automatic braking based on the collision avoidance assistance; and
determining whether the object is present in front of the vehicle on the basis of the present position of the object until the automatic braking based on the collision avoidance assistance is finished from the start thereof.

* * * * *